United States Patent [19]

Ebert

[11] Patent Number: 5,188,511
[45] Date of Patent: Feb. 23, 1993

[54] HELICOPTER ANTI-TORQUE DEVICE DIRECT PITCH CONTROL

[75] Inventor: Frederick J. Ebert, Westport, Conn.

[73] Assignee: United Technologies Corporation, Hartford, Conn.

[21] Appl. No.: 750,389

[22] Filed: Aug. 27, 1991

[51] Int. Cl.⁵ .............................................. F04D 29/18
[52] U.S. Cl. ................................. 416/25; 60/39.282; 244/17.19; 416/27; 416/31; 416/38
[58] Field of Search ................... 416/31, 25, 27, 30, 416/35, 36, 37, 38, 40, 41, 42; 60/39.282

[56] References Cited

U.S. PATENT DOCUMENTS

| | | | |
|---|---|---|---|
| 2,998,210 | 8/1961 | Carter, Jr. ................ | 244/17.13 |
| 3,174,284 | 3/1965 | McCarthy ................ | 416/25 |
| 4,392,203 | 7/1983 | Fischer et al. .......... | 244/17.13 |
| 4,436,482 | 3/1984 | Inoue et al. ............. | 416/27 |
| 4,466,526 | 8/1984 | Howlett et al. ......... | 416/30 |
| 4,493,465 | 1/1985 | Howlett et al. ......... | 244/17.13 |
| 4,628,455 | 12/1986 | Skutecki ................. | 244/17.13 |
| 4,807,129 | 2/1989 | Perks ...................... | 244/17.13 |
| 4,934,825 | 6/1990 | Martin .................... | 416/35 |
| 4,993,919 | 2/1991 | Schneider ............... | 416/35 |
| 5,020,316 | 6/1991 | Sweet et al. ............ | 60/39.282 |
| 5,046,923 | 9/1991 | Parsons et al. ......... | 416/30 |

FOREIGN PATENT DOCUMENTS 2135479 8/1984 United Kingdom ............ 244/17.13

Primary Examiner—John T. Kwon
Attorney, Agent, or Firm—Michael Grillo

[57] ABSTRACT

The blade angle controlling pitch beam servo (26) of a helicopter tail rotor (22) is responsive to a main rotor torque signal (92) indicative of torque coupled to a helicopter main rotor (10) for providing torque compensation so that the helicopter airframe will not counter-rotate under the main rotor. The torque coupled to the main rotor is that amount of engine torque (76, 114) in excess of torque coupled to the tail rotor (81, 115) and helicopter auxiliaries (84, 116). The amount of torque compensation provided by the tail rotor is reduced by an amount indicative of aerodynamic forces (130) on the helicopter airframe.

8 Claims, 4 Drawing Sheets

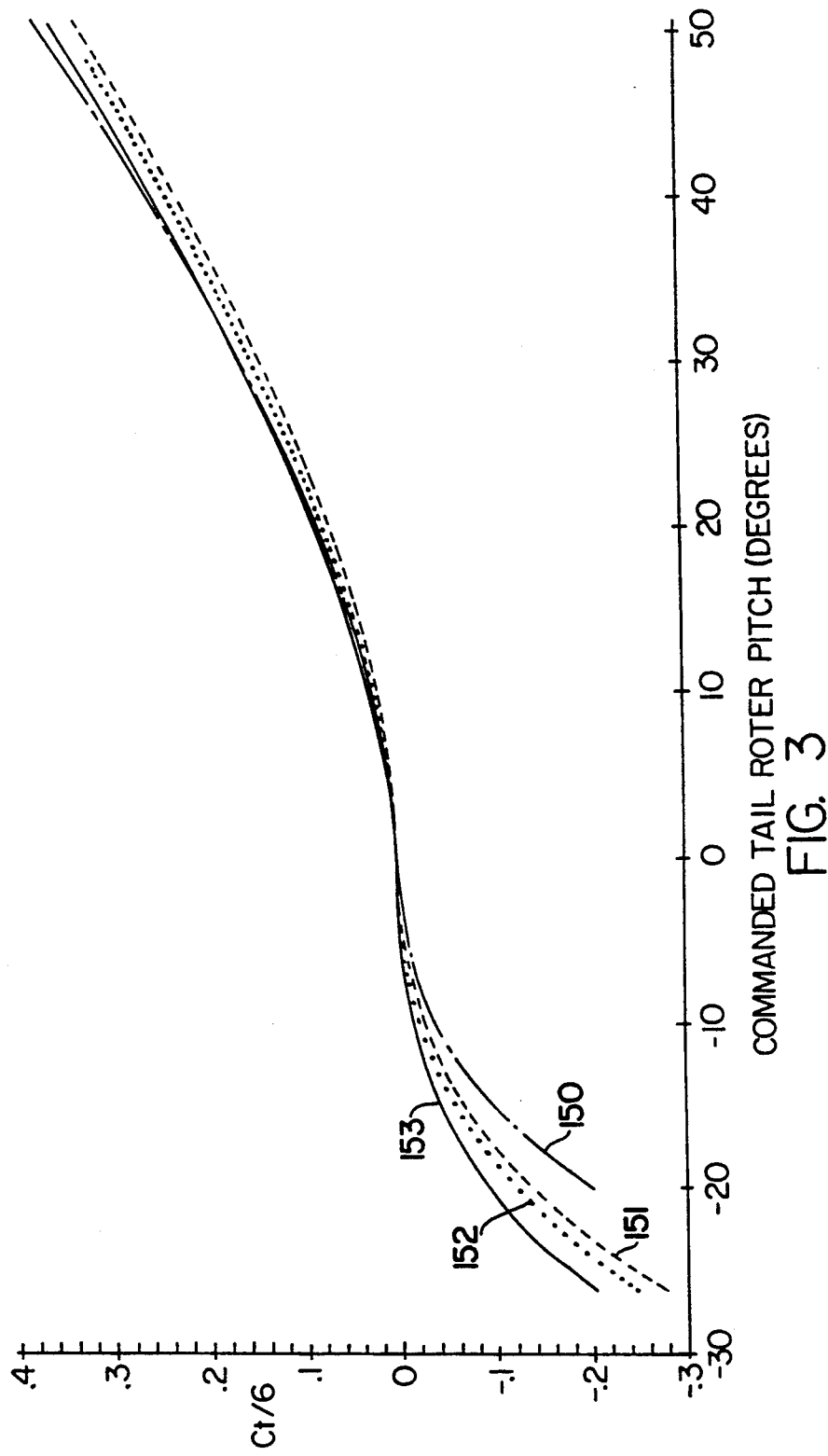

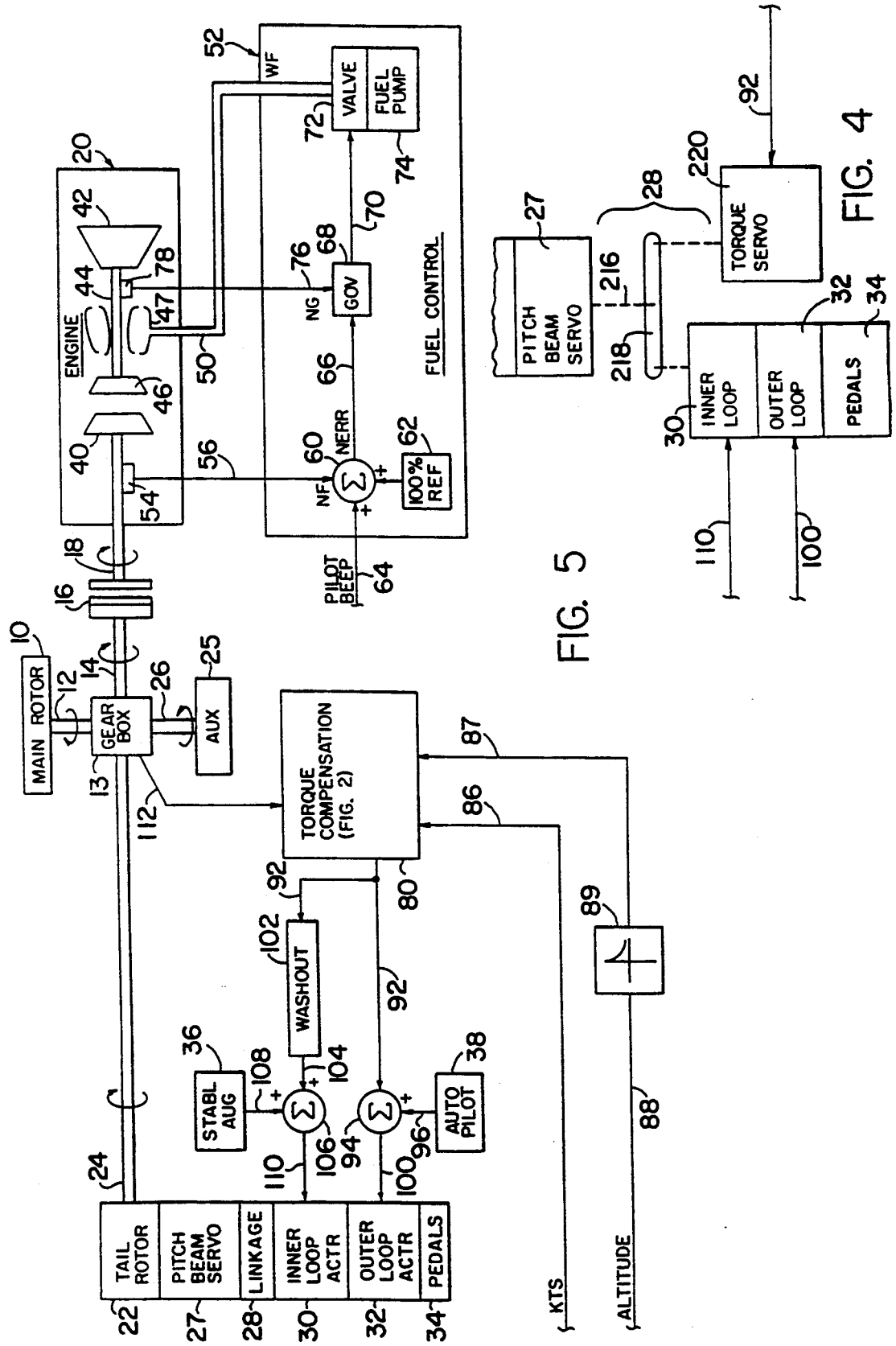

HELICOPTER ANTI-TORQUE DEVICE DIRECT PITCH CONTROL

The Government has rights in this invention pursuant to Contract No. DAAJ09-89-C-A002 awarded by the Department of the Army.

DESCRIPTION

TECHNICAL FIELD

This invention relates to helicopters, and more particularly to improved means for stabilizing a helicopter airframe against rotation as a consequence of reaction to torque coupled to the main rotor.

BACKGROUND ART

As is known, one typical type of helicopter has a main rotor which produces lift and forward thrust in response to torque provided thereto through rotary power means, including an engine, in a manner determined by the pitch angle of the rotor blades. In order to stabilize the airframe against rotation as a consequence of the torque applied by the engine to the main rotor, this type of helicopter has a tail rotor, the rotary speed of which is a fixed geared function of the speed of the main rotor. The angle of the tail rotor blades, in addition to being adjustable to provide maneuvers in yaw, is adjusted to provide thrust to apply torque to the airframe, about a yaw axis, which will compensate for the torque applied by the engine to the main rotor, so that the airframe will be rotationally stable rather than tending to rotate under the rotor. One method of control over the amount of compensating thrust provided by the tail rotor is achieved by varying the tail rotor pitch angle as a function of the amount of collective pitch angle of the main rotor blades.

Thus, the tail rotor blade angle pitch beam is provided with a command component which bears a fixed ratio to the collective pitch command to the main rotor, referred to as collective/tail pitch mixing or proportional blade pitch mixing.

The problem with proportional blade pitch mixing of the type described hereinabove is that it is incapable of providing a correct amount of torque compensation for both dynamic and steady-state operating conditions of the aircraft. For example, it is well known that the relationship between main rotor torque and collective pitch is not constant with forward speed increasing from hovering flight. Additionally, because of changes in aerodynamic wake patterns at the tail of the aircraft, the relationship between tail rotor thrust and tail rotor collective pitch may vary. Additional variability in the desired tail rotor blade pitch angle compared with main rotor collective pitch is introduced with variations in helicopter weight, center of gravity, climb speed, altitude and air temperature. Thus, the proportional collective/tail rotor mixing is at best a compromise which must be compensated, either by the pilot repositioning anti-torque pedals or by an automatic heading hold system, even during steady flight conditions.

Similarly, under dynamic conditions such as maneuvering transients, the proportion of collective pitch may bear no relation at all to the torque being imparted by the engine to the main rotor drive train and thus, being reacted on the airframe. For example, when the rotor is declutched from the drive train during auto-rotation, collective pitch stick manipulation will cause direct input of tail rotor blade pitch angle through collective/tail pitch mixing, causing the generation of unwanted yaw moment on the airframe which must be neutralized by the pilot or the heading hold system. Similarly, when resuming power flight following an auto-rotation descent, the engine is initially at idle, but the rotor speed has increased to the level necessary to maintain the desired rate of descent. In order to arrest the descent, a large positive collective pitch input is required. This results in a corresponding yaw moment introduced by the collective/tail mixing. Initially, as long as the rotor speed exceeds the engine speed, the engine is still approximately at idle and there is no airframe torque reaction because the rotor is still disengaged from the engine. Therefore, any torque compensation by collective/tail mixing will cause a yaw moment which must be compensated for by the pilot or heading hold system. As soon as the rotor slows sufficiently that its speed is equal to or below that of the engine, the clutch reengages, initially causing a droop in engine speed due to the torque loading thereof; the engine speed in attempting to regain the reference engine speed, spools up at a high rate and provides a torque overshoot. At this stage of the transient, there is inadequate torque compensation so that the pilot must reverse his pedal input. These examples illustrate that under both steady-state and maneuvering flight conditions, main rotor collective pitch is an inadequate indicator of the level of engine torque reaction on the airframe which must be compensated by the tail rotor.

In response to the problems associated with proportional blade pitch mixing of the type described above, U.S. Pat. No. 4,493,465 to Howlett et. al. provides an improved means for stabilizing the helicopter airframe against rotation which adjusts the blade pitch angle of the helicopter tail rotor in response to a parameter indicative of gas generator speed in a helicopter having a free turbine engine. The parameter may be a direct measurement of gas generator speed, or other suitable indicator of engine speed, e.g., fuel supply, free turbine or other output shaft torque or acceleration. Said patent greatly improves the torque compensation provide by the tail rotor by controlling tail rotor pitch with a signal which more accurately represents main rotor induced torque on the airframe.

However, it has been found that the torque compensation provided by said patents is not correct for various dynamic and steady-state conditions of the aircraft. For example, a parameter indicative of gas generator speed is indicative of total engine torque, rather than main rotor torque, and does not account for that portion of main rotor torque required to drive the tail rotor and helicopter auxiliary equipment, e.g., generators and hydraulic pumps. Therefore, compensation based on the gas generator speed signal alone may produce a slight yaw transient which must be compensated for either by the pilot or by the heading hold system.

Additionally, the patent to Howlett et. al. neglects the torque contribution generating by the aerodynamic forces on the airframe, e.g., the aerodynamic forces on the fuselage and tail surfaces. Additionally, in newer generation helicopters, a shrouded fan rather than a conventional tail rotor may be used for torque compensation, and aerodynamic forces on the shroud affect both the torque on the airframe and the performance of the tail fan. As used herein, the term "tail rotor" is intended to refer to helicopter anti-torque devices including both the convention type of torque compensation device, i.e., a tail rotor, and the newer generation tail fan devices. The aerodynamic forces on the tail portion of the aircraft include those forces on the tail fan shroud of a helicopter using a tail fan as a torque compensation device.

At high speeds, said patent may provide compensation that would not be required or desired. For example, at 120 knots, one type of helicopter will generate sufficient aerodynamic force not to require any contribution from the tail rotor whatsoever. Therefore, the tail rotor contribution may tend to cause slight yaw variations or biases in the heading of the aircraft. These biases remain almost invisible to the pilot because of compensation by a heading hold or stability augmentation system (SAS). However, a torque compensation system which does not take into account aerodynamic effects and allows the SAS to drive the final aircraft heading solution will not result in as accurate pointing of the vehicle, which will decrease the effectiveness of a ballistic solution. For example, even if the pilot cannot tell the difference between a 0.25 degree amplitude oscillation in the yaw axis and a 0.1 degree amplitude oscillation, the latter solution will increase the kill probability because of reduced projectile scattering.

DISCLOSURE OF INVENTION

Objects of the invention include providing improved helicopter engine torque compensation which is essentially correct under substantially all operating conditions.

According to the present invention, the blade pitch angle of a helicopter tail rotor is adjusted, in order to provide compensation for torque on the helicopter airframe by the main rotor, in response to a signal substantially indicative of torque coupled to the main rotor. In accordance with one aspect of the present invention, the tail rotor blade pitch angle is controlled as a function of a parameter indicative of engine speed less that portion of engine torque attributable to the tail rotor and helicopter auxiliary equipment, thereby providing a signal substantially indicative of torque coupled to the main rotor. In accordance with another aspect of the present invention, the blade pitch of the helicopter tail rotor is controlled in relation to the amount of torque on the main rotor ring gear, which provides a signal directly related to the torque coupled to the main rotor.

In further accord with the present invention the signal indicative of torque coupled to the main rotor for controlling the tail rotor blade pitch angle is modified by a signal indicative of the aerodynamic force on the helicopter airframe.

The present invention provides improved helicopter engine torque compensation by providing a signal substantially equivalent to the torque placed on the airframe by the helicopter main rotor. The torque signal may be derived by indirectly measuring the torque output of the engine and thereafter subtracting the torque contribution of the tail rotor and auxiliary systems. Alternatively, the torque signal may be derived by directly measuring the torque on the main rotor for example, by measuring the transmission ring gear torque and subtracting therefrom other helicopter rotor shaft contributions, e.g., sun gear torque. Additionally, the present invention controls the amount of tail rotor compensation based on the torque contribution of the aerodynamic forces on the helicopter airframe. Therefore, a torque contribution by the tail rotor is reduced or eliminated at high air speeds where the airframe aerodynamic forces are sufficient to counteract the rotor torque on the airframe.

The present invention may be implemented in a variety of ways in conjunction with a variety of rotor driving means. For instance, when analog signals are available indicative of torque such as fuel rate, engine shaft speed, output shaft torque or acceleration, or the like, an analog signal may by used. Thereafter, analog signals indicative of tail rotor and auxiliary system torque are subtracted therefrom to provide a signal substantially indicative of main rotor torque. Similarly, whenever a digital fuel control is involved, the invention may be practiced (in response to commensurate signals) utilizing dedicated digital components, or it may be implemented in software applied to a digital fuel control which includes a microprocessor or the like. Similarly, digital implementation of the invention may be achieved by utilizing software within an automatic flight control system computer, when one is available on the aircraft.

The invention may be practiced by applying the torque compensating tail rotor pitch angle commands to a yaw outer loop actuator, when one is available on the aircraft, or to an additional actuator utilized to provide motion to the linkages currently used in an aircraft for fixed, collective/tail mixing (with or without input through a stability, inner loop actuator). All of the ways in which the present invention may be practiced and utilized are well within the skill of the art in the capacity of existing technology, in the light of the teachings which follow hereinafter.

The foregoing and other objects, features and advantages of the present invention will become more apparent in the light of the following detailed description of exemplary embodiments thereof, as illustrated in the accompanying drawings.

BRIEF DESCRIPTION OF THE DRAWINGS

FIG. 3 is a graphical representation of tail rotor pitch angle versus a normalized, nondimensional tail rotor thrust coefficient for various helicopter air speeds used by the torque compensation portion of FIG. 2;

FIG. 4 is a simplified schematic diagram of a separate servo embodiment of the present invention; and FIG. 5 is a simplified schematic illustration of an alternative embodiment of the helicopter drive system of the present invention.

BEST MODE FOR CARRYING OUT THE INVENTION

The tail rotor pitch control of the present invention is of a type described in U.S. Pat. No. 4,493,465 to Howlett et. al., entitled HELICOPTER ENGINE TORQUE COMPENSATOR, the disclosure of which is incorporated herein by reference. The tail rotor blade pitch control of the present invention is particularly well suited for providing accurate tail rotor torque compensation in response to a signal which is substantially indicative of the rotational torque on the helicopter airframe in reaction to torque coupled to the main rotor, the tail rotor torque compensation further being controlled to account for aerodynamic forces on the helicopter airframe which counteract torque coupled to the main rotor.

Figure 1:
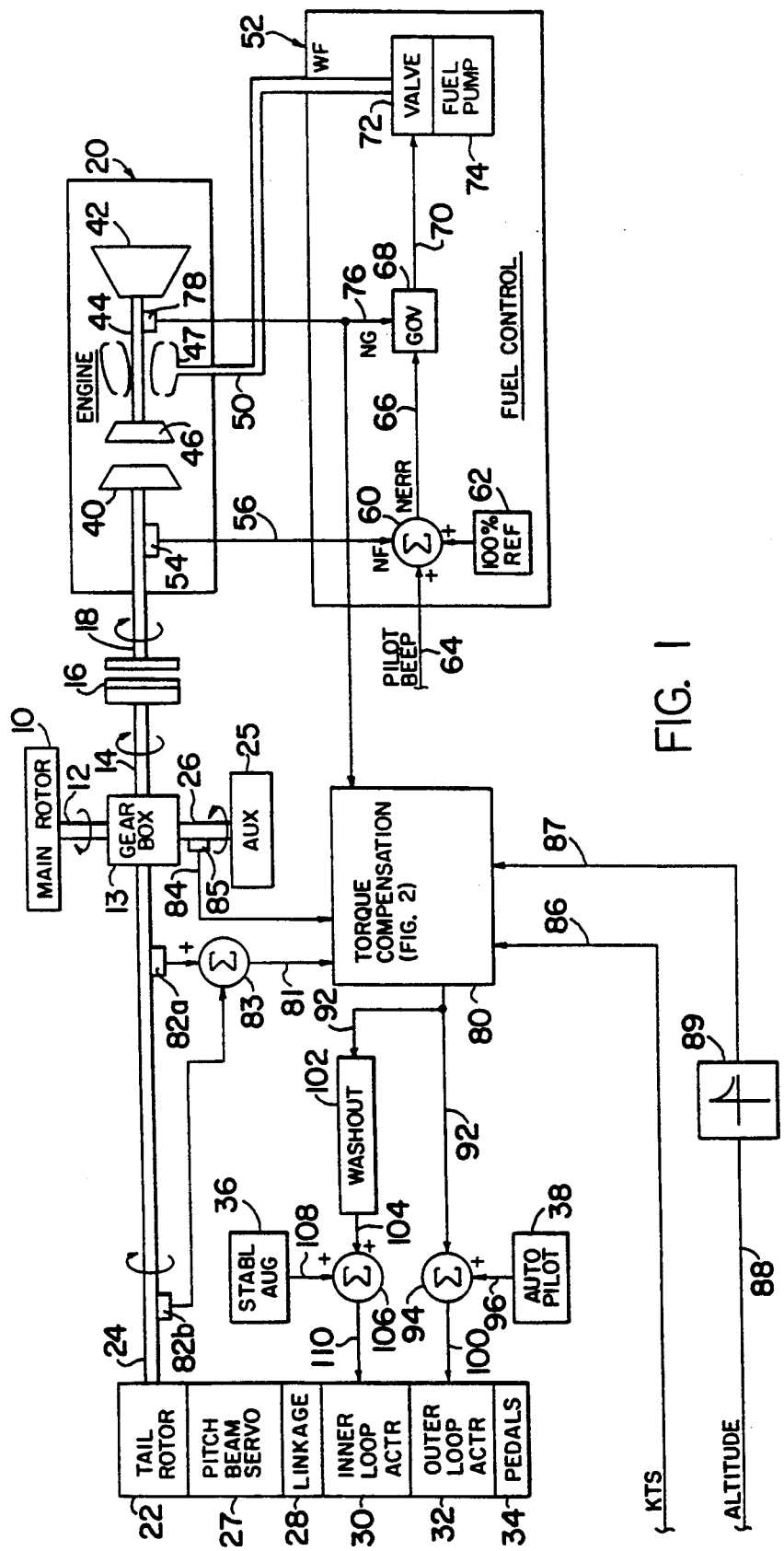
FIG. 1 is a simplified schematic block diagram of a helicopter drive system incorporating one embodiment of the present invention.

Referring now to FIG. 1, a main rotor 10 is connected through a shaft 12 to a gearbox 13 (transmission) which is driven by a shaft 14 through an over running clutch 16, which engages an output shaft 18 of an engine 20 when the engine speed equals or exceeds the rotor speed. The gearbox also drives a tail rotor 22 through a shaft 24 so that the main rotor 10 and the tail rotor 22 are always driven at speeds bearing a fixed relationship to each other, such as the tail rotor rotating about five times faster than the main rotor. The gearbox 13 additionally drives a plurality of auxiliary devices 25, e.g., generators and hydraulic pumps, through a plurality of shafts 26. The pitch angle of the blades on the tail rotor 22 is adjusted by a tail-mounted pitch beam servo 27 in response to inputs thereto provided by linkage 28 which connects the pitch beam servo 27 to controls therefore in the forward part of the airframe. These may include a yaw inner loop actuator 30, a yaw outer loop actuator 32 and pilot pedals 34, all of which may be of any known type. The yaw inner loop actuator 30 is controlled essentially by signals from a stability augmentation system (SAS) 36, and the yaw outer loop actuator 32 is controlled essentially from an autopilot system 38. Although not shown, the inner loop actuator 30 is usually also responsive to functions provided thereto from the autopilot system 38. The inner and outer yaw controls 30-38 may be as described more fully in commonly owed U.S. Pat. No. 5,392,203 to Fischer et al., entitled AIRCRAFT COORDINATED TURN WITH A LAGGED ROLL RATE, the disclosure of which is incorporated herein by reference.

The engine 20 may typically comprise a free turbine gas engine in which the output shaft 18 is driven by a free turbine 40, which is in turn driven by gases from a gas generator including a turbocompressor having a compressor 42 connected by a shaft 44 to a compressor-driving turbine 46, and a burner section 47 to which fuel is applied by fuel lines 50 from a fuel control 52. The fuel control 52 typically tries to provide the correct rate of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60. The other inputs to the summing junction 60 comprise a reference speed, which typically is a reference value indicative of 100 percent rated speed derived from a source 62, together with any pilot desired variant therein as determined by a signal from the pilot's engine speed beeper on a line 64. The output of the summing junction 60 is a speed error signal (NERR) on a line 66 which is applied to the governor portion 68 of the fuel control, the output of which is a commanded fuel rate (WFCMD) on a line 70. This is applied to a metering valve 72 so as to cause the correct amount of fuel from a fuel pump 74 to be applied to the fuel inlet lines 50, all in a way that is well known within the art. Within the governor 68, a signal indicative of gas generator speed (NG) on a line 76 may be taken from a tachometer 78 responsive to the gas generator spool including the compressor 72, the shaft 44 and the turbine 46.

A torque compensation portion 80 of the helicopter drive system controls the tail rotor blade pitch angle for torque compensation in response to the gas generator speed on the line 76. Another input to the torque compensation portion 80 is a signal indicative of tail rotor torque on a line 81. The tail rotor torque signal may be provided for example by measuring the twist in the tail rotor drive shaft, e.g., by placing a pair of axially aligned sensors 82a, 82b adjacent the tail rotor shaft 24, one sensor 82a being placed adjacent the gear box 13 and the other sensor 82b being placed adjacent an intermediate gear (not shown), and measuring the difference of when a pair of axially aligned marks on the shaft activate the sensors 82a, 82b at a summing junction 83, the difference being proportion to the twist in the shaft 24. The sensors 82a, 82b and marks may be of any suitable type known in the art, e.g., magnetic switches and magnets. A further input to the torque compensation portion 80 are signals indicative of speeds of the plurality of auxiliary devices 25 on lines 84 taken from a plurality of tachometers 85. The torque compensation portion 80 is also responsive to signals on lines 86 and 87 respectively indicative of helicopter speed (KTS) provided for example by an air-speed sensor, and air density ($\rho$) as determined by applying an altitude signal on the line 88 to a function generator 89 which generates a signal indicative of air density for a given altitude. The altitude signal may be provided from any suitable known device such as a radar altimeter or a laser altimeter.

The output of the torque compensation portion 80 is provided on a line 92 to a summing junction 94 for addition with the autopilot command signal on a line 96 from the autopilot system 38, so as to provide a signal on a line 100 which incorporates both torque compensation and autopilot signals. If desired, for faster response, the signal from the torque compensation portion 80 can also be provided through suitable filtering circuits such as a wash-out circuit 102 to provide a signal on a line 104 for application to a summing junction 106 for addition with the stability augmentation system command signal on a line 108 from the stability augmentation system 36, so as to provide a signal on a line 110, indicative of both stability augmentation and fast response to torque compensation requirements to the yaw inner loop actuator 30.

Figure 2:
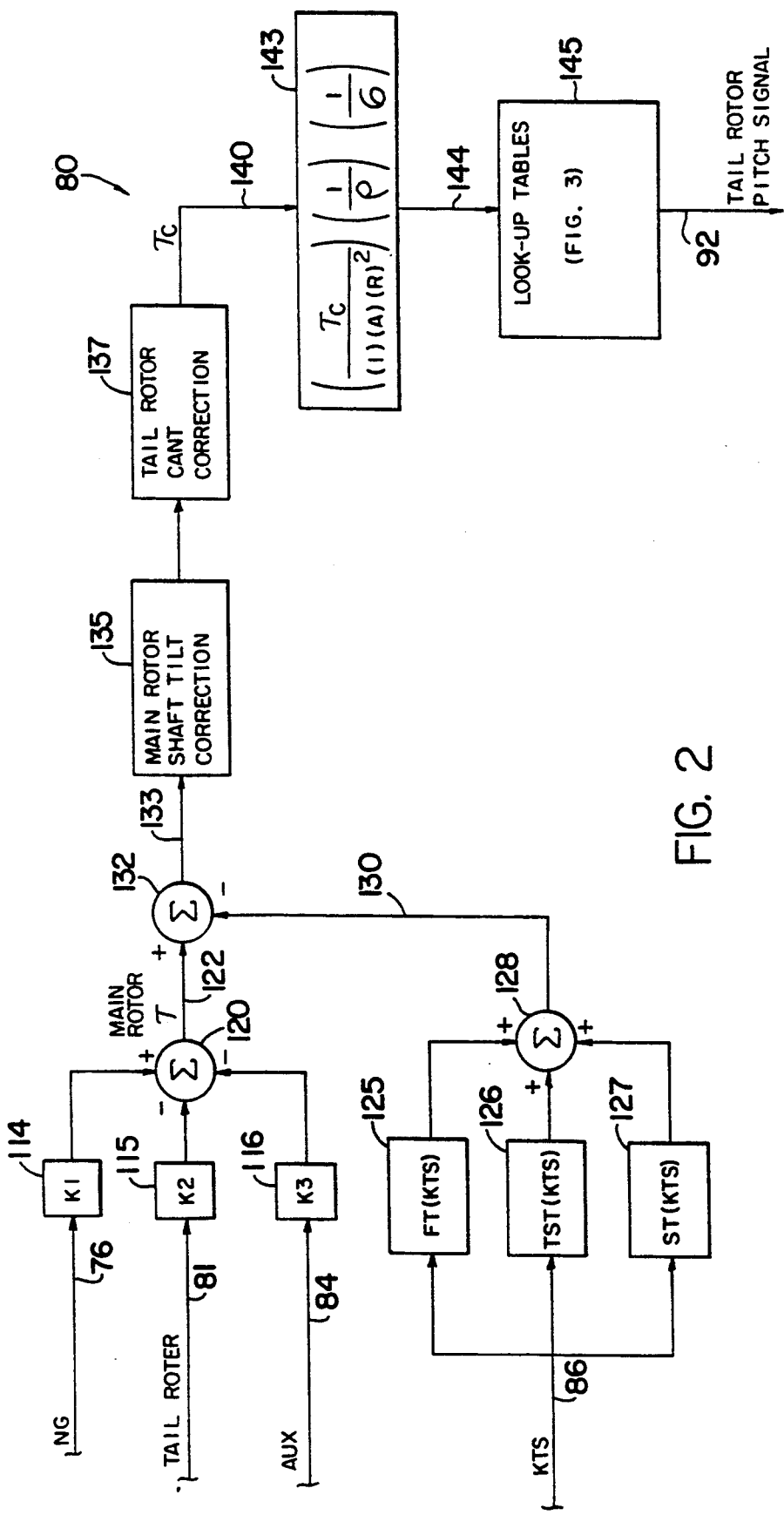
FIG. 2 is a simplified schematic diagram of a torque compensation portion of the helicopter drive system of FIG. 1.

Referring now to FIG. 2, the torque compensation portion 80 is illustrated in greater detail. The gas generator speed, tail rotor twist and auxiliary speeds are respectively applied to signal processing means 114, 115 and 116, which in the simplest embodiment of the invention may simply be suitable gains, e.g., K1, K2, and K3, to respectively provide signals indicative of engine torque, tail rotor torque and auxiliary system torque. The output of the signal processing means 114-116 are applied to a summing junction 120 wherein the tail rotor and auxiliary system torque contributions are subtracted from the engine torque to thereby provide a signal indicative of main rotor torque on the line 122.

The helicopter speed signal is applied to function generators 125, 126, and 127, which respectively provide signals indicative of the aerodynamic torque generated by the fuselage, the tail surface, and the shroud (for aircraft having a tail fan rather than a tail rotor) which are summed at a summing junction 128, the output of which is a total aerodynamic torque signal on a line 130, which is applied to a summing junction 132 for subtraction from the main rotor torque signal on the line 122. The output of the summing junction 132 is a signal on a line 133 indicative of that portion of main rotor torque which is not compensated for by aerodynamic forces. This signal is corrected for main rotor shaft tilt in the step 135 so that only that portion of main rotor torque which applies a rotational force on the airframe will be corrected for by the tail rotor. If desired, further correction may be provided in the step 137 for any cant in the tail rotor, so that if the tail rotor is at an angle, sufficient torque will be generated by the tail rotor in the direction opposite of the torque of the main rotor. The corrected main rotor torque signal ($\tau_C$) is provided on a line 140, and is indicative of that amount of torque coupled to the main rotor which must be counteracted by the tail rotor.

The corrected torque signal is converted into a corresponding normalized, non-dimensional tail rotor thrust coefficient ($C_t/\sigma$) in a step 143 which takes into account the moment arm through which the tail rotor acts, air density and the solidity of the tail rotor, i.e., the area of the tail rotor blades in proportion to the total tail rotor area, as given by the following relationship:

$$C_t/\sigma = \frac{\tau_C}{(L)(A)(R^2)} \frac{1}{\rho} \frac{1}{\sigma} \quad \text{(Eq. 1)}$$

where L is the distance from the tail rotor hub to the aircraft center of gravity along the fuselage station, A is the area of the tail rotor blades, R is the radius of the tail rotor and $\sigma$ is the solidity of the tail rotor.

The normalized thrust coefficient is then entered into a lookup table 145 for providing a tail rotor blade pitch signal on the line 92. The lookup table is a three-dimensional array which converts the normalized thrust coefficient into a corresponding tail rotor pitch angle for a given helicopter speed. FIG. 3 contains representative characteristics of commanded tail rotor pitch angle versus normalized thrust coefficient for various helicopter speeds, e.g., hover (150), 50 knots (151), 100 knots (152) and 150 knots (153) as defined by lookup tables 145.

The embodiment illustrated in FIG. 1 utilizes gas generator speed as the engine function or parameter related to engine torque because this provides a somewhat leading indication of the required torque compensation as compared with utilizing the free turbine speed signal on the line 56. The tail rotor and auxiliary system torque are thereafter subtracted from the engine torque to provide a signal substantially indicative of main rotor torque. If desired, however, additional lead may be achieved by utilizing the fuel rate command signal on the line 70 rather than the gas generator speed signal on the line 76. Or, the turbine speed signal on the line 56 could be differentiated (acceleration) and used in place of the signal on the line 76. As shown in the alternative embodiment of FIG. 5, a signal indicative of main rotor torque on line 112 can be obtained directly by measuring the torque on the main rotor ring gear (not shown) in the gear box 13. Thereafter, the ring gear torque measurement is corrected for other non-rotor torque contributions, e.g., the sun gear torque, to provide the main rotor torque signal on the line 122 of FIG. 2. In a system which does not employ a free turbine gas engine 20 of the type described herein, either engine output shaft torque or speed, or engine fuel rate signals may be utilized, where available. None of this is essential to the present invention, so long as a rotor driving system signal indicative of torque is utilized, the invention will provide significant advantages as described hereinbefore.

The embodiment of FIG. 1 utilizes the yaw outer loop actuator as an input for torque compensation. Instead, the torque compensation may be applied through the linkage in the same fashion as it is when fixed, collective/tail mixing is employed. This is illustrated in FIG. 4 in which the linkage 28 is seen to include a cable 216 which is moved differentially in response to a mixer 218 which is connected to the inner and outer loop and the pedals 30-34 on one side, and to a torque servo 220 on the other side. In conventional helicopters known to the art, the mixer 218 is responsive to a linkage taken from the collective pitch control to provide fixed, collective/tail mixing. The use of a torque servo 220 is required only to convert from a torque compensating tail rotor blade pitch angle command on a line 92 (which may be any of those described hereinbefore) to a mechanical input to the pitch beam servo 27.

Additionally, the present invention may also be employed as a trimmer for systems of the type currently employed wherein the tail rotor blade pitch angle is adjusted in a fixed manner with respect to collective pitch. In such a case, the fixed, compromise value of torque compensation is provided by the fixed, collective/tail mixing of the type well known in the art, and the only difference between that and a desired torque compensation blade angle is provided by the present invention. This type of trimmer control may be as described more fully in the aforementioned U.S. Pat. No. 4,493,465 to Howlett et. al.

The invention is described as providing main rotor shaft tilt correction 135 (FIG. 2) and tail rotor cant correction 137 (FIG. 2) for a more accurate determination of the torque coupled to the main rotor which must be overcome by the tail rotor, however, these corrections could just as easily be incorporated into the Look-Up table 145. Additionally, although the corrected main rotor torque ($\tau_C$) is converted into a corresponding normalized, non-dimensional tail rotor thrust coefficient, the invention would work equally as well if the look-up table was provided to be entered directly with corrected main rotor torque.

As described briefly hereinbefore, the invention may be readily implemented in an aircraft having a digital fuel control system implemented in part by a microprocessor simply by providing the necessary signal processing by programming to accomplish the desired result, for application either to the existing yaw actuators, or to an additional torque servo 220 of the type illustrated in FIG. 4, or both. The invention may also be practiced in systems having digital fuel controls by utilizing software in the automation flight control system computer to accomplish the desired signal processing. In other cases, either analog or dedicated digital circuitry may be provided as desired to accomplish the effects of the present invention. All of the foregoing changes and variations are irrelevant; it suffices that the invention may be practiced by controlling the tail rotor blade pitch angle for engine torque compensation in response to a signal which is substantially indicative of torque coupled to the main rotor, which torque is corrected for aerodynamic forces.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

I claim:

1. A helicopter comprising:
   a main rotor;
   a tail rotor;
   an engine for driving said main rotor and said tail rotor;
   a closed loop fuel control for maintaining the rotor speed constant by providing a fuel rate signal in response to an engine speed signal; and
   tail rotor pitch control means for providing a tail rotor pitch command signal indicative of the tail rotor pitch required to maintain yaw;
   characterized by:
   tail rotor torque indicating means for providing a tail rotor torque signal indicative of engine torque coupled to said tail rotor;
   auxiliary torque indicating means for providing an auxiliary torque signal indicative of engine torque coupled to helicopter auxiliaries;
   engine torque indicating means for providing an engine torque signal indicative of engine torque;
   main rotor torque indicating means responsive to sad tail rotor torque signal, said auxiliary torque signal and said engine torque signal for providing a main rotor torque signal indicative of engine torque in excess of torque coupled to said tail rotor and torque coupled to said auxiliaries; and
   said tail rotor pitch control means comprising means responsive to said main rotor torque signal for providing said tail rotor pitch command signal to compensate for torque coupled to said main rotor.

2. A helicopter according to claim 1 wherein said engine torque indicating means is responsive to said engine speed signal for providing said engine torque signal.

3. A helicopter according to claim 1 wherein said engine torque indicating means is responsive to said fuel rate signal for providing said engine torque signal.

4. A helicopter according to claim 1 further comprising:
   helicopter speed indicating means for providing a helicopter speed signal indicative of the speed of the helicopter;
   aerodynamic force indicating means response to said helicopter speed signal for providing an aerodynamic force signal indicative of the aerodynamic forces acting on the helicopter; and
   said tail rotor pitch control means comprising means responsive to said aerodynamic force signal and said main rotor torque signal for providing said tail rotor pitch command signal to compensate for torque coupled to said main rotor in excess of said aerodynamic forces acting on the helicopter.

5. A helicopter comprising:
   a main rotor;
   a tail rotor;
   a free turbine engine for driving said main rotor and said tail rotor;
   a closed loop fuel control for maintaining the rotor speed constant by providing a fuel rate signal in response to an engine output shaft speed signal and a gas generator speed signal; and
   tail rotor pitch control means for providing a tail rotor pitch command signal indicative of the tail rotor pitch required to maintain yaw;
   characterized by:
   tail rotor torque indicating means for providing a tail rotor torque signal indicative of engine torque coupled to said tail rotor;
   auxiliary torque indicating means for providing an auxiliary torque signal indicative of engine torque coupled to helicopter auxiliaries;
   engine torque indicating means for providing an engine torque signal indicative of engine torque;
   main rotor torque indicating means responsive to said tail rotor torque signal, said auxiliary torque signal and said engine torque signal for providing a main rotor torque signal indicative of engine torque in excess of torque coupled to said tail rotor and torque coupled to said auxiliaries; and
   said tail rotor pitch control means comprising means responsive to said main rotor torque signal for providing said tail rotor pitch command signal to compensate for torque coupled to said main rotor.

6. A helicopter according to claim 5 wherein said engine torque indicating means is responsive to said gas generator speed signal for providing said engine torque signal.

7. A helicopter according to claim 5 wherein said engine torque indicating means is responsive to said fuel rate signal for providing said engine torque signal.

8. A helicopter according to claim 5 further comprising:
   helicopter speed indicating means for providing a helicopter speed signal indicative of the speed of the helicopter;
   aerodynamic force indicating means response to said helicopter speed signal for providing an aerodynamic force signal indicative of the aerodynamic forces acting on the helicopter; and
   said tail rotor pitch control means comprising means responsive to said aerodynamic force signal and said main rotor torque signal for providing said tail rotor pitch command signal to compensate for torque coupled to said main rotor in excess of said aerodynamic forces acting on the helicopter.

* * * * *